United States Patent [19]
Fleishman

[11] 3,841,684
[45] Oct. 15, 1974

[54] DISPOSABLE TONGS

[76] Inventor: Seymour Fleishman, 856 W. Belden Ave., Chicago, Ill. 60614

[22] Filed: Dec. 26, 1972

[21] Appl. No.: 318,465

[52] U.S. Cl.................. 294/1 R, 294/16, 294/118
[51] Int. Cl............................................. B25b 7/00
[58] Field of Search............ 294/1 R, 16, 25, 86 R, 294/106, 118; 119/1; 229/15, 42

[56] References Cited
UNITED STATES PATENTS

| | | | |
|---|---|---|---|
| 650,539 | 5/1900 | Lawson et al.................. | 294/118 X |
| 790,329 | 5/1905 | Taylor............................ | 294/118 X |
| 2,561,374 | 7/1951 | Igoe ............................... | 294/118 X |
| 2,643,151 | 6/1953 | Zupancic ........................ | 294/118 |
| 2,653,844 | 9/1953 | Detwiler ......................... | 294/118 |
| 2,705,588 | 4/1955 | Huckstep....................... | 229/32 |

Primary Examiner—Evon C. Blunk
Assistant Examiner—Johnny D. Cherry
Attorney, Agent, or Firm—Max R. Kraus

[57] ABSTRACT

Disposable tongs formed of sheet material, such as cardboard or the like, made of two identically constructed members each provided with a slit or slot intermediate the length whereby the user interconnnects the two members along said slits or slots so that they form a pair of jaw members at the lower end and handle members at the opposite end so that it can be used by a person for picking up animal excrement or other objects without touching same, said device being so inexpensively produced that it may be disposed of after each use.

9 Claims, 8 Drawing Figures

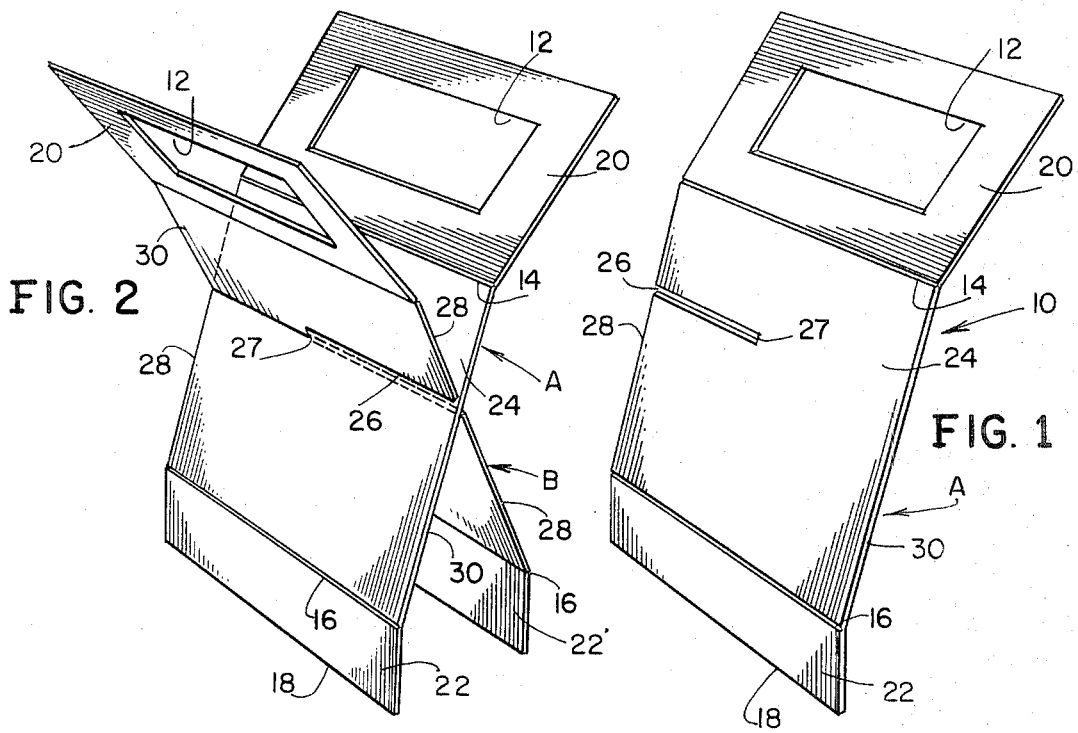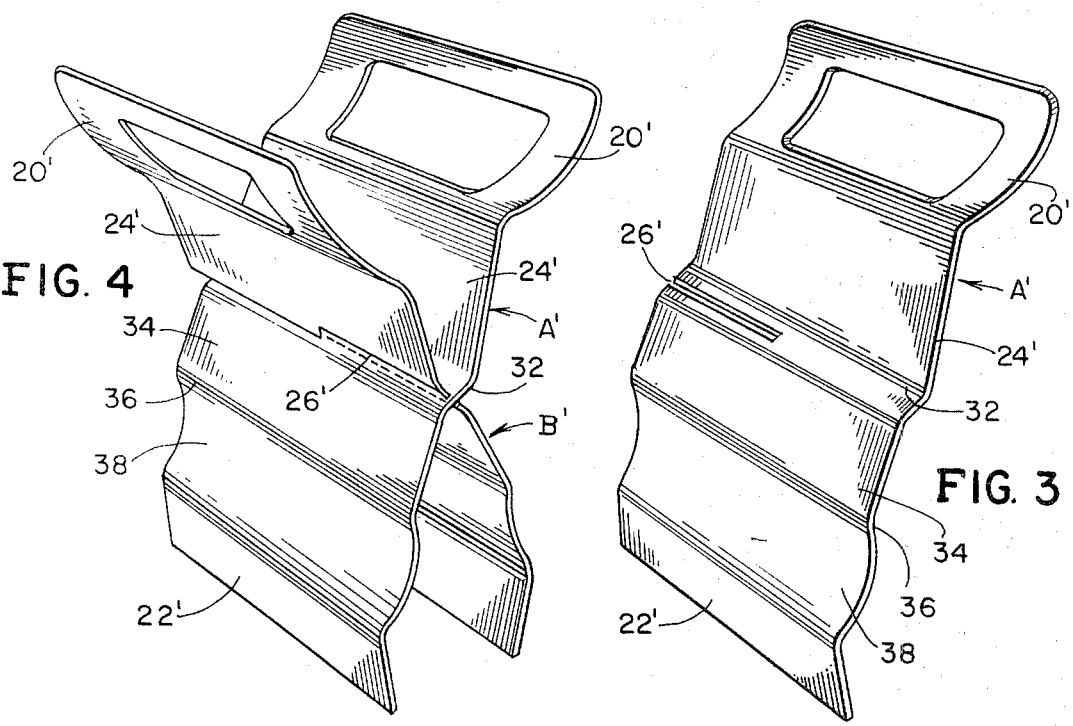

DISPOSABLE TONGS

BRIEF SUMMARY OF THE INVENTION

It is recognized that the excrement of pets such as dogs and the like which is deposited on sidewalks and streets not only creates an unsightly environment but presents a health hazard and is extremely objectionable to those who walk in that area. As a consequence, many urban areas are attempting to pass ordinances to require the owner of a pet to remove the excrement. An object of this invention therefore is to provide a very simple and inexpensive tongs formed of cardboard or some similar inexpensive material which the user can immediately put together so that it forms tongs with jaw members at one end and handle members at the other end so that it can be operated to pick up the excrement or fecal matter and place it in a disposable bag, which matter, tongs and bag can be disposed of. Thus, the invention envisions tongs having a one-time use, which embodies two identical members formed of sheet material, each member being provided with a transversely extending slit or slot so that the two members can be interconnected at their slots to form an X-shaped configuration and permit pivotal movement of said members to grasp, pick up and deposit animal excrement in a bag without the person's hand touching the excrement. The tongs may likewise be used for picking up other objects.

Another object of this invention is to provide disposable tongs having a one-time use and which may be inexpensively produced.

BRIEF DESCRIPTION OF THE DRAWINGS

In the drawings

FIG. 1 is a perspective view of a strip of cardboard die cut and scored to form one of the two members of the tongs, the other member being identical.

FIG. 2 is a perspective view of the two identical members interconnected at the juncture of the slots to form the tongs.

FIG. 3 is a view of a modification, similar to that of FIG. 1, in which the member is molded or formed of a plastic material.

FIG. 4 is a perspective view of the two members interconnected; and

FIGS. 1 and 2

Figure 5:
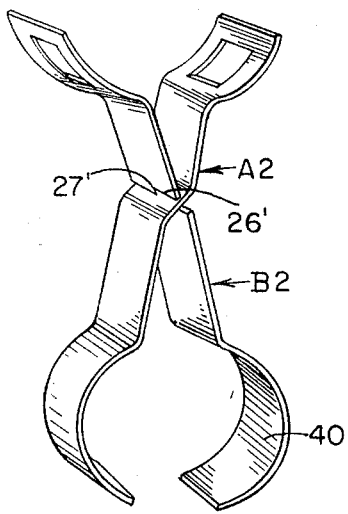
FIGS. 5 through 8 show various modifications in which the two members are likewise formed of a plastic material as shown in FIGS. 3 and 4.

The disposable tongs comprises two identically constructed members of sheet material, like that shown in FIG. 1, before being assembled. One of said members is designated by the letter A and the other by the letter B. Each said member may be formed of a cardboard material of generally rectangular-shape, designated at 10, provided adjacent the top with a rectangular-shaped cutout 12, with a transversely extending score line 14 positioned below the cutout 12, with a transversely extending score line 16 spaced from but adjacent the bottom edge 18 of the member. The upper portion designated at 20, above the transverse score line 14 forms the handle. The lower portion designated at 22 and below the score line 16 forms the jaw member, and the portion 24 between the score lines 14 and 16 forms the intermediate portion. The intermediate portion 24 is provided with a transversely extending slot 26 which extends from one side edge 28 to approximately the center of the width of the member. Thie opposite side edge is designated at 30.

The two identically shaped members A and B may be placed in a package so that the user at the time of use may readily assemble same to form the tongs shown in FIG. 2. At the time of assembly the member 10 is folded slightly along the upper score line 14 and is inclined at a slight angle. The lower portion is folded slightly inwardly along the score line 16. With the member A positioned as shown in FIG. 1, that is, with the edge 28 and slot 26 on the left side, the other identical member B is reversed so that the edge 28 and slot 26 are on the right side and the two members A and B are connected together by sliding them inwardly relative to each other at their respective slots 26 so that the inner edges 27 of the slots 26 abut each other and the intermediate portions 24 form an X-configuration. When thus positioned, the edge 30 of member A will be opposite edge 28 of member B.

The connection formed by the interengaging slots 26 provides a pivotal connection therebetween, similar to the pivotal action of a scissors or the like. By virtue of such connection a person by engaging the handle portions 20 and bringing them together at said end will cause the jaw members 22 at the lower ends to come together so that the jaws can be positioned around the animal excrement to permit it to be lifted and placed in a disposable bag without the person's hands coming in contact with such matter. Although the tongs of this invention can be used once and disposed of, it will be understood that a number of pieces of excrement or fecal matter can be lifted and placed in a bag during any one time use of the tongs, after which it is disposed of by placing it in the bag.

FIGS. 3 and 4

While there is shown tongs formed of two members A and B which are made of a sheet cardboard material, it will be understood that the members may be molded inexpensively of a plastic material, such as vinyl or the like, and when so constructed each member, designated by the letters A' and B' will be molded in the shape and configuration shown in FIG. 3, in which the upper portion 20' which forms the handle of the tongs is offset with respect to the plane of the intermediate portion 24'. The intermediate portion is inclined inwardly as at 32 and continues in a planar portion 34 and then slopes outwardly as at 36, curves inwardly as at 38 and terminates in a lower jaw 22'. The slot 26' is formed along the inclined portion 32 of the intermediate portion 24'.

The two identical members A' and B' are connected at their slots 26' similar to that previously described and as shown in FIG. 4 and will operate in the same manner previously described. The inclined portion 32 permits free movement of the scissors action in a material too rigid to flex as cardboard does, and tends to keepe the two members A' and B' more precisely alined.

FIGS. 5 through 8

FIG. 5 is a view of the two members A2 and B2 configured so that each has an arcuate-shaped jaw 40 at the lower end. The upper portion of each of said members and the transverse slots are the same as shown in FIGS. 3 and 4 and the two members A2 and B2 are connected and operate in the same scissors-like manner as in FIGS. 3 and 4.

Figure 6:
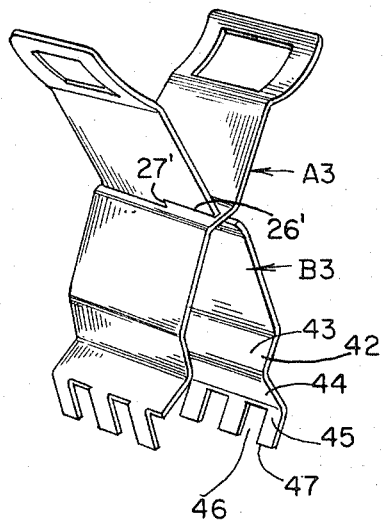

FIG. 6 shows the two members A3 and B3 with the jaw portions 42 sloping inwardly as at 43 and then inclining outwardly as at 44 and then sloping inwardly as at 45, with the inwardly sloping ends formed with spaces 46 which provide spaced teeth 47. The teeth of one member interfit in the spaces of the other member when they are brought together.

Figure 7:
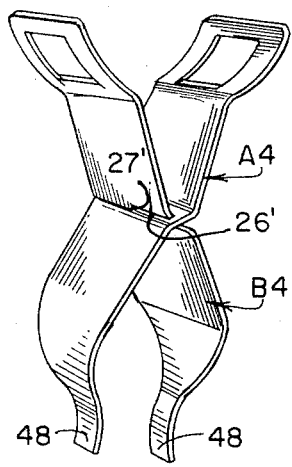

FIG. 7 shows the two members A4 and B4 shaped at their lower ends to form tapering fingers 48 which operate as the pickup jaws.

Figure 8:
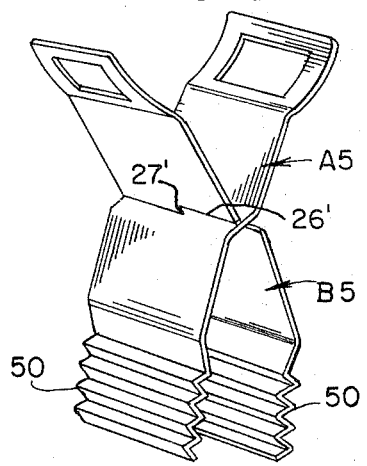

FIG. 8 shows the two members A5 and B5 with the lower jaws corrugated or ribbed as at 50 to more positively engage the object to be picked up.

The modifications shown in FIGS. 5 through 8 are formed or molded preferably of a plastic material such as vinyl or the like and each has the transverse slot like the slots 26' and 27' of the FIGS. 3 and 4 embodiment where the two members are connected for the scissors-like operation. In each instance the pairs of members are identical so that they can be fabricated from the same mold and are connected by reversing one with respect to the other, as previously described. The various embodiments may be inexpensively produced and may be used as tongs for picking up various objects, obviously not limited to animal excrement.

While this invention has particular application in connection with animal excrement and the like, it will be understood that it can be used for other purposes having a substantially one time use.

What is claimed is:

1. Disposable tongs formed of a pair of identically constructed strips formed of cardboard or like material, each having spaced side edges, each having a transversely extending slot extending intermediate the top and bottom of said strip and extending from one side edge inwardly but spaced from the opposite side edge, whereby the two strips can be connected together at their slots to form a pivoted connection at said connected slots without the use of extraneous fastening means so that the two strips form tongs, each of said strips having a jaw member at the lower end thereof, and each of said strips having a cutout adjacent the top with the upper portion of each of said strips forming a handle for manual engagement so that same may be manually engaged and moved towards each other to move the jaw members towards each other so that the jaw members can grasp and hold the material or matter to be engaged by the tongs.

2. Tongs as set forth in claim 1 in which the lower portion of each of the strips is transversely scored to form jaws at the lower ends.

3. Tongs as set forth in claim 1 in which each of said members is molded of a plastic material and has sufficient rigidity to prevent substantial deformation when used as tongs.

4. Tongs as set forth in claim 3 in which the jaws are provided with spaced interfitting teeth.

5. Disposable tongs as set forth in claim 1 in which the pair of identically constructed strips are each formed of a plastic material of sufficient rigidity to prevent substantial deformation when used as tongs.

6. Disposable tongs formed of a pair of identically constructed strips molded of plastic material of sufficient rigidity to prevent substantial deformation when used as tongs, each of said strips having a handle at the upper end, a jaw member at the lower end and an intermediate portion between the handle and the jaw member, each having spaced side edges, each having a transversely extending slot in the intermediate portion and extending from one side edge inwardly but spaced from the opposite side edge, whereby the two strips can be connected together by their slots to form a pivoted connection at said connected slots without the use of extraneous fastening means so that the two strips form tongs, one of said strips being reversely positioned with respect to the other, with one of the slots facing in one direction and the other slot facing in the opposite direction, said strips forming an X-configuration, each of said strips adapted to be manually engaged at the handle and moved toward each other to move the jaw members toward each other so that the jaw members can grasp and hold the material or matter to be engaged by the tongs, said jaw members being provided with spaced interfitting teeth.

7. Tongs as set forth in claim 6 in which the jaws are provided with arcuate-shaped ends.

8. Tongs as set forth in claim 6 in which the jaws are corrugated.

9. Tongs as set forth in claim 6 in which the jaws are tapered fingers.

* * * * *